Oct. 18, 1966 G. EVANS 3,279,434
ANIMAL FEEDING DEVICE
Filed March 18, 1965 2 Sheets-Sheet 2
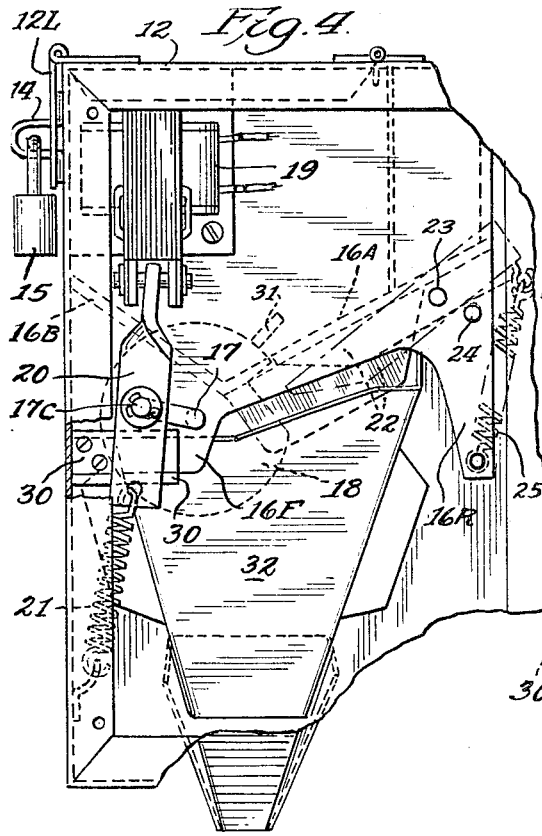
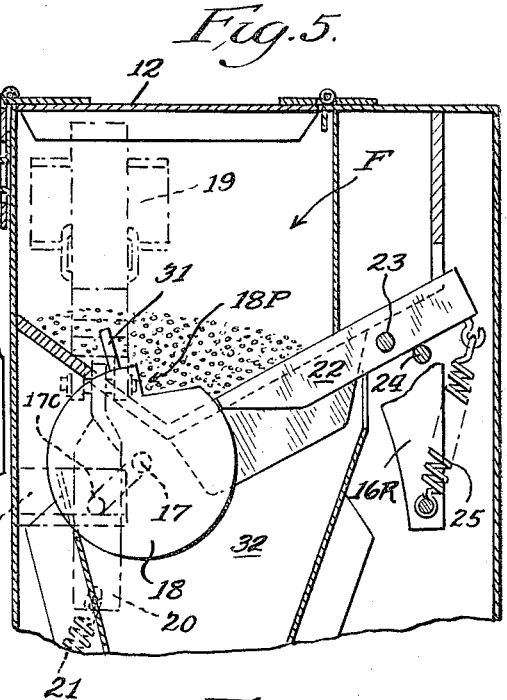
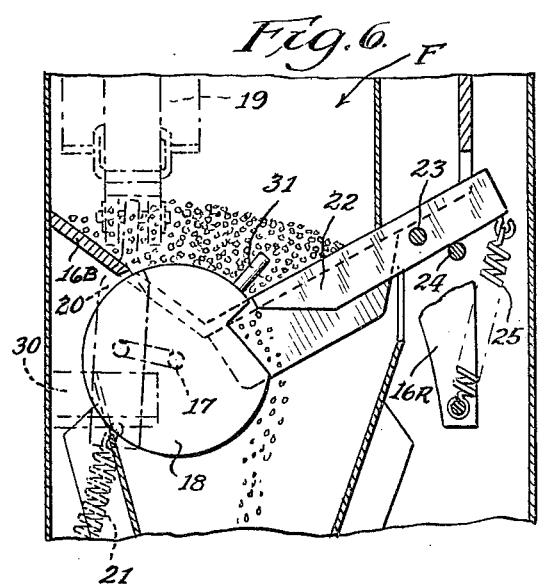
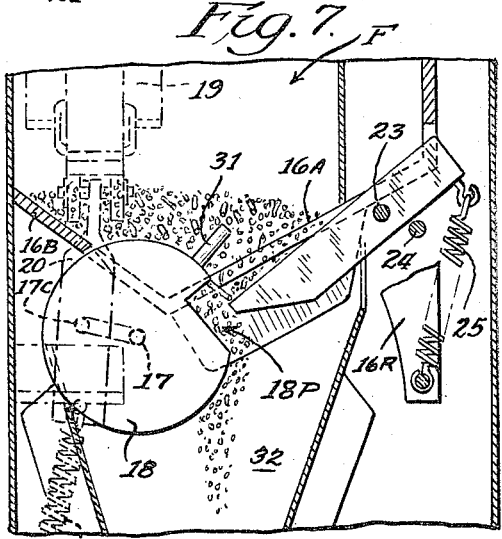
Inventor
Grant Evans
By Mann, Brown & McWilliams
Attys.

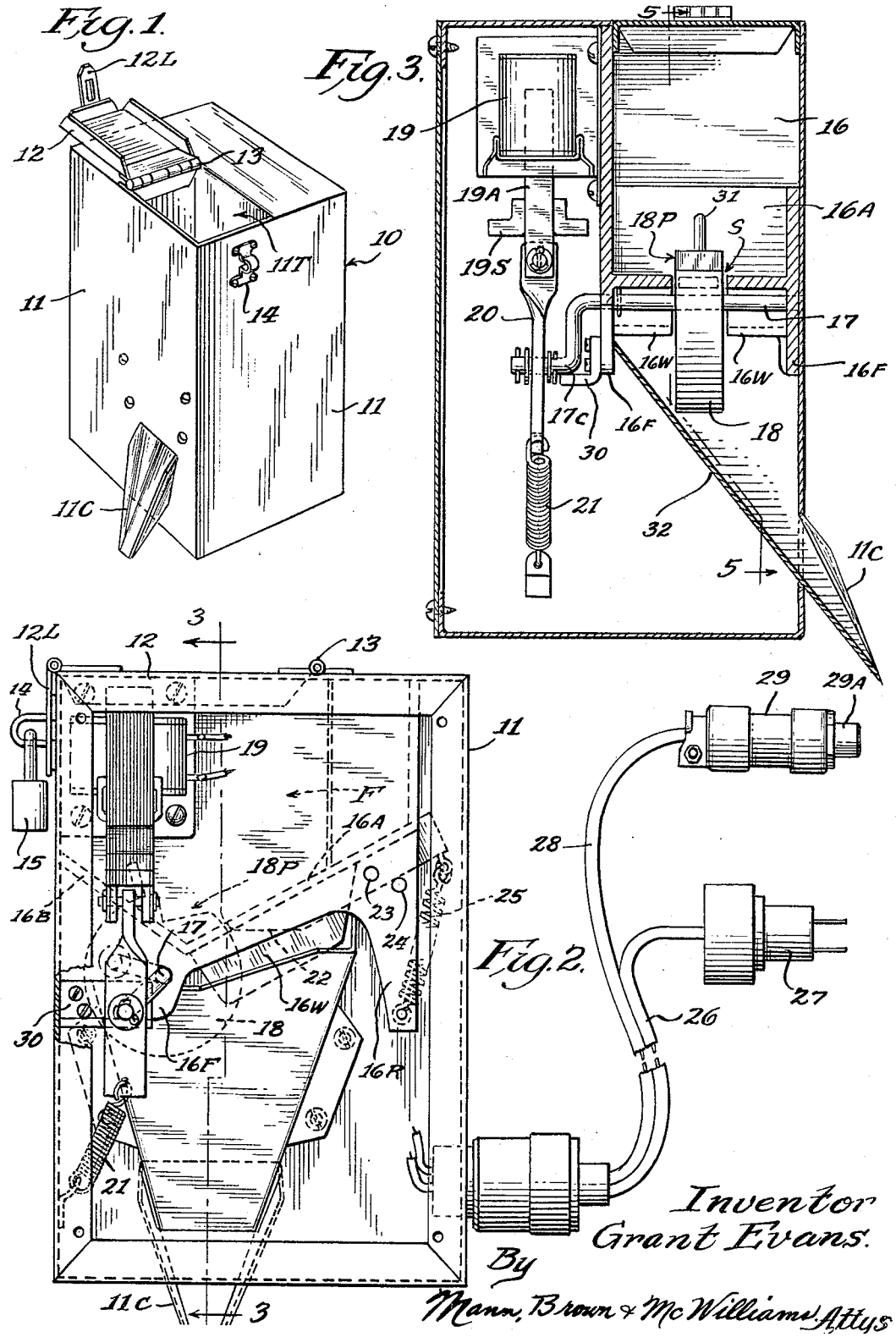

United States Patent Office 3,279,434
Patented Oct. 18, 1966

3,279,434
ANIMAL FEEDING DEVICE
Grant Evans, Hot Springs, Ark., assignor to Animal Behavior Enterprises Incorporated, a corporation of Arkansas
Filed Mar. 18, 1965, Ser. No. 440,812
2 Claims. (Cl. 119—56)

This invention relates to an animal feeding device that is primarily useful in connection with training animals and maintaining the animals trained by the use of food rewards. The invention is particularly concerned with an automatically operable animal feeding device arranged to deliver small amounts of commercial dry, granulated or pellet feeds, the particles of which may be of various sizes.

An ideal animal feeder must deliver substantially uniform small amounts of feed when it is used as part of an animal training program, as the purpose of the program is to reward rather than to nourish. For this reason, the feeder should be reliable, not prone to jamming or to frequent failure to deliver, particularly where the feed is not uniform in size.

While precision feed and reliability are musts, it is also important that the feeder be simple, fast in operation, and easy to produce.

The principal object of the present invention is to provide an animal feeding device capable of high speed delivery of uniform quantities of feed of irregular sizes with high precision and reliability.

Another object is the provision of an animal feeding device which facilitates remote or automatic control and wherein the feeder is not subject to jamming or to failure to deliver.

Still another object is the provision of a feeder of low cost that is easy to manufacture and that is capable of high precision metering of the feed.

Other objects and advantages will become apparent during the course of the following description and claims.

In the accompanying drawings forming a part of this specification and in which like numerals are employed to designate like parts throughout the same:

FIG. 1 is a perspective view of the animal feeding device constructed in accordance with this invention;

FIG. 2 is an enlarged side elevational view of the device with one side wall omitted to facilitate disclosure;

FIG. 3 is a transverse cross sectional view through the feeder and is taken as indicated on the line 3—3 of FIG. 2;

FIG. 4 is a fragmentary side elevational view corresponding generally to that of FIG. 3 and illustrating the parts in discharged relation;

FIG. 5 is a cross sectional view taken approximately as indicated on line 5—5 of FIG. 3;

FIG. 6 is a cross sectional view corresponding generally to that of FIG. 5 and showing the parts in discharge relation; and FIG. 7 is a cross sectional view corresponding to that of FIG. 6 and illustrating the action of the release arm in the event of jamming of the feed.

Referring now to the drawings, the animal feeding device is shown in its entirety at 10 in FIG. 1 and it consists of a box-shaped housing 11 having a top opening 11T to receive feed and having a bottom discharge chute 11C for discharging precision metered quantities of feed. A cover 12 is secured to the top by means of a hinge 13 for controlling access to the housing. The cover 12 is shown with a latch 12L that cooperates with a keeper 14 to receive a lock 15 of any suitable type.

In the prefered form which is shown herein for purposes of illustrative disclosure, the housing 11 receives a one-piece hollow casting 16 which provides the actual feed storage compartment F, the casting 16 being open at the top to communicate with the top opening 11T of the housing. The casting 16 has a base trough at the lower region of the feed storage compartment F, this base trough being defined by oppositely inclined meeting walls 16A and 16B and the trough having a downwardly open bottom discharge slot S substantially centrally thereof with one slot end leading up one base wall and the other slot end leading up the other base wall.

The casting 16 has integral interior depending wings 16W closely flanking and leading directly downwardly of the slot, and it has a front set of depending integral exterior wings 16F and a rear set of depending integral exterior wings 16R which provide for convenient attachment of the various feeder control devices. An axle 17 is journalled in the front wings 16F at a location underlying one end of the slot S and a feed wheel 18 is fixed on the axle 17 to rotate concentrically with it. The feed wheel 18 has an arcuate periphery extending through and filling one end of the slot and provided with a radical pocket 18P opening into the feed compartment. The axle 17 terminates outboard of the casting 16 in a crank end 17C and an electromagnet 19 is secured directly to the casting at an outboard location generally overlying the crank end 17C. The electromagnet has an armature 19A secured to a drive arm 20 which is engaged intermediately upon the crank end 17C for imparting limited rotation to the feed wheel 18, to swing the same between the position in which it is represented in FIGS. 2 and 5 and the position in which it is represented in FIGS. 4 and 6. While gravity or other means could be utilized for restoring the feed wheel upon de-energization of the electromagnet, a bias spring 21 is preferably provided and has one end anchored to the housing wall and the other end to the drive arm 20 normally to bias the drive arm downwardly and hold the feed wheel at a position wherein its pocket opens upwardly into the feed compartment F.

The remainder of the slot S is normally blocked by a release arm 22 which is rotatable about an axis defined by a pivot pin 23 which is mounted in the casting 16 at a location external of the feed compartment F. In FIGS. 2, 5 and 6 the release arm 22 is shown in a position to block the portion of the slot which is not occupied by the feed wheel 18, the release arm 22 being resiliently swingable downwardly from this position to relieve any jamming problems which may arise due to irregular feed sizes. While a release arm 22 of resilient leaf form could be utilized, it is preferred to utilized a rigid arm mounted to rotate about a fixed axis. A stop pin 24 is associated with the release arm and is mounted in the rear wings 16R to limit the maximum upward position of the slot blocking end of the release arm, with a spring 25 being connected to the remote end of the release arm and to the rear wing structure 16R normally to bias the arm against the stop 24.

The electrical wiring circuit for controlling energization of the electromagnet is represented generally in FIG. 2 and it includes a power cord 26 terminating in a wall plug 27 that may be inserted in any conventional service outlet, and a control cord 28 terminating in a push button switch 29 having an actuator element 29A that may easily be operated by an animal or by a human, depending upon the training program in which the feeder is being used.

In the normal operation of the device the actuator 29A will be triggered either momentarily or for some longer sustained interval to energize the electromagnet and lift the drive arm 20 for rotating the feed wheel 18 from the position of FIGS. 2 and 5 to that of FIGS. 4 and 6. In the illustrated arrangement this involves approximately a 90 degree rotation of the crank 17C. When the actuator is released, the electric current pulse terminates and the bias spring 21 draws the drive arm 20 downwardly to restore the feed wheel. The armature 19A is provided with an external stop 19S (FIG. 3) to limit upward travel of the drive arm 20 and the casting 16 is fitted with an L-shaped outboard stop 30 to contact the crank and limit downward travel of the drive arm. A stirrer rod 31 is shown projecting radially from the feed wheel 18 adjacent to the pocket at a location which is always within the feed compartment. Each time the feed wheel moves, the stirrer rod 31 agitates the feed to keep it free and flowable, and insure that the proper charge of feed will enter the pocket in preparation for delivery by the action of the feed wheel. The housing is fitted with an internal chute 32 which underlies the slot and leads into the upper end of the delivery chute 11C.

In the event a large feed pellet should lodge in the pocket 18P of the feed wheel, the motion of the feed wheel 18 will force the large pellet against the release arm 22 which will respond and swing downwardly to a position such as is illustrated in FIG. 7. Thus where a jamming condition exists, the pellet or pellets causing the jamming will be forced against the release arm 22 and cause it to widen the region through which the feed may be discharged. In these instances the large pellet, together with the smaller grains will still be fed. The response of the release arm for opening the discharge region occurs only while the jamming condition exists and when the large pellet clears, the release arm 22 restores under the control of the spring 25. The action of the release arm minimizes the force requirements on the electromagnet, it being sufficient that to provide sufficient strength to overcome the feed wheel return spring 21 and the release arm return spring 25. This reduces the cost of the device.

It should be noted that the average charge of feed which is delivered by the device is independent of the time of operation of the actuator 29A so that no likelihood of overfeeding arises.

It is desirable that the feed wheel and arm be of aluminum to reduce weight and enable faster operating action. In fact, the arrangement presently disclosed is particularly arranged to ensure high speed operation. A good animal training feeder device should deliver feed within a fraction of a second upon being triggered, because the effectiveness of the food reward depends in part upon the speed of delivery following the completion of the desired performance of the animal. High speed delivery is achieved while retaining uniformity of metering action and without requiring high powered or expensive devices. It should be apparent that the limited rotation of the feed wheel 18 as determined by the stops 19S and 30 makes it feasible to enjoy a parti-circular configuration.

Thus, while prefered constructional features of the invention are embodied in the structure illustrated herein, it is to be understood that changes and variations may be made by those skilled in the art without departing from the spirit and scope of the appended claims.

What is claimed is:

1. An animal feeding device comprising a housing having a supply opening at the top, a casting nested within the housing in rigid relation thereto and providing a feed storage compartment communicating with the top opening and having a base trough provided with a downwardly open discharge slot closely flanked by depending integral wing structure carried on the casting, said casting having additional wider spaced depending wing structure flanking one end of said slot, an axle journaled in said additional wing structure to extend crosswise beneath the slot and terminating in a crank end outboard of the casting, a feed wheel fixed on said axle to rotate concentrically therewith and having an arcuate periphery filling said one slot end and having a pocket opening radially through its periphery, a pivot pin mounted to said casting to define an axis external of said compartment, a release arm mounted on said pivot pin to rotate about it axis and normally filling the other slot end to complete closure of said slot, stop means fixed on said casting to define a slot closing position for the release arm, resilient means reacting between said casting and said release arm normally to urge the same towards its slot closing position, an electromagnet mounted to said casting outboard thereof and having a drive arm connected to said crank end to rotate the axle through part of a revolution, spring means mounted between said housing and said crank end to reversibly restore the crank end upon de-energization of the electromagnet, positive stops limiting movement of the drive arm to provide about 90 degree crank rotation, and an electrical circuit for energizing the electromagnet momentarily to effect rotation of the feed wheel and discharge of feed from said pocket, with said electromagnet, when energized, having sufficient force to overcome the action of the spring means and having sufficient force also to overcome the action of the resilient means and swing the release arm downwardly to free any feed tending to jam between the feed wheel and the release arm, said feed wheel carrying a stirrer extending radially therefrom at a region thereof that is adjacent said pocket and is always within the compartment to agitate the feed upon each actuation of the electromagnet and thereby insure free flow of feed at the region of the pocket.

2. An animal feeding device comprising a housing having a supply opening at the top, and including a feed storage compartment communicating with the top opening and having a base trough provided with a downwardly open discharge slot, an axle journaled in said housing to extend crosswise beneath the slot and terminating in a crank end, a feed wheel fixed on said axle to rotate concentrically therewith and having an arcuate periphery filling one end of said slot and having a pocket opening radially through its periphery, a pivot pin secured to said housing to define an axis external of said compartment, a release arm mounted on said pivot pin to rotate about its axis and normally filling the other slot end to complete closure of said slot, stop means for defining a slot closing position for said release arm, resilient means reacting between said housing and said release arm normally to urge the same towards its slot closing position, an electromagnet carried by said housing and having a drive arm connected to said crank end to rotate the axle through part of a revolution, spring means mounted between said housing and said crank end to reversibly restore the crank end upon de-energization of the electromagnet, positive stops limiting movement of the drive arm to provide about 90 degree crank rotation, and an electrical circuit for energizing the electromagnet momentarily to effect rotation of the feed wheel and discharge of feed from said pocket, with said electromagnet, when energized, having sufficient force to overcome the action of the spring means and having sufficient force also to overcome the action of the resilient means and swing the release arm downwardly to free any feed tending to jam between the feed wheel and the release arm, said feed wheel carrying a stirrer extending radially therefrom at a region thereof that is adjacent said pocket and is always within the compartment to agitate the feed upon each actuation of the electromagnet and thereby insure free flow of feed at the region of the pocket.

References Cited by the Examiner

UNITED STATES PATENTS

| 2,772,659 | 12/1956 | Tennis | 119—51.11 |
| 2,793,791 | 5/1957 | Clark | 119—56 X |
| 2,869,638 | 1/1959 | Sullivan | 119—51.11 X |

FOREIGN PATENTS

| 223,881 | 1/1943 | Switzerland. |

SAMUEL KOREN, *Primary Examiner.*

HUGH R. CHAMBLEE, *Examiner.*